United States Patent
Liu et al.

(10) Patent No.: US 8,019,304 B2
(45) Date of Patent: Sep. 13, 2011

(54) COMMUNICATION SYSTEM FOR WIFI AND WIMAX SIGNAL TRANSMISSION

(75) Inventors: I-Ru Liu, Taipei County (TW); Ting-Yi Tsai, Taipei County (TW); Tai-Ho Wu, Taipei County (TW); Yi-Yuan Yang, Hsinchu (TW); Hsiu-Ling Chen, Hsinchu (TW)

(73) Assignee: Accton Technology Corporation, Hsinchu (TW)

( * ) Notice: Subject to any disclaimer, the term of this patent is extended or adjusted under 35 U.S.C. 154(b) by 902 days.

(21) Appl. No.: 11/892,574

(22) Filed: Aug. 24, 2007

(65) Prior Publication Data

US 2008/0089350 A1 Apr. 17, 2008

(30) Foreign Application Priority Data

Oct. 17, 2006 (TW) .............................. 95138270 A

(51) Int. Cl.
H04B 1/44 (2006.01)
(52) U.S. Cl. ................... 455/277.1; 455/41.2; 455/132
(58) Field of Classification Search ............... 455/41.1, 455/41.2, 63.4, 78, 80, 82, 132, 550.1, 140, 455/200.1, 272, 275, 277.1; 370/401
See application file for complete search history.

(56) References Cited

U.S. PATENT DOCUMENTS

| 7,532,867 | B1 * | 5/2009 | Mo et al. ......................... 455/78 |
| 2004/0192222 | A1 | 9/2004 | Vaisanen et al. |
| 2005/0101350 | A1 | 5/2005 | Wang |
| 2007/0066314 | A1 * | 3/2007 | Sherman et al. .............. 455/445 |
| 2007/0167187 | A1 * | 7/2007 | Rezvani et al. ............ 455/550.1 |
| 2007/0178839 | A1 * | 8/2007 | Rezvani et al. ................. 455/62 |
| 2007/0232358 | A1 * | 10/2007 | Sherman ....................... 455/560 |

FOREIGN PATENT DOCUMENTS

| TW | 200612661 | 4/2006 |
| TW | 200614587 | 5/2006 |
| TW | 200629938 | 8/2006 |
| TW | 200644329 | 12/2006 |

* cited by examiner

Primary Examiner — Blane J Jackson
(74) Attorney, Agent, or Firm — Bacon & Thomas, PLLC

(57) ABSTRACT

A communication system includes a microprocessor, a WiFi device, a WiMAX device, common antennas, and switching devices. The common antennas are for receiving a WiFi signal and a WiMAX signal. Each of the switching devices has an input terminal coupled to the corresponding common antenna, a first output terminal coupled to the WiFi device and a second output terminal coupled to the WiMAX device. When the communication system is applied to a WiFi system, the microprocessor controls the switching devices to isolate the WiMAX signal and couple the WiFi signal via the first output terminals to the WiFi device; when the communication system is applied to a WiMAX system, the microprocessor controls the switching devices to isolate the WiFi signal and couple the WiMAX signal via the second output terminals to the WiMAX device.

18 Claims, 4 Drawing Sheets

COMMUNICATION SYSTEM FOR WIFI AND WIMAX SIGNAL TRANSMISSION

This application claims the benefit of Taiwan application Serial No. 95138270, filed Oct. 17, 2006, the subject matter of which is incorporated herein by reference.

BACKGROUND OF THE INVENTION

1. Field of the Invention

The invention relates in general to a communication system, and more particularly to a communication system which includes a wireless fidelity (WiFi) system and a worldwide interoperability for microwave access (WiMAX) system and can operate simultaneously under the WiFi system and the WiMAX system.

2. Description of the Related Art

The WiFi system and the WiMAX system are both very popular communication systems nowadays. The WiFi system is widely applied to local area network (LAN) with a bandwidth about 2.4 GHz~2.5 GHz. Limited by the size of an area, the WiFi system is mostly used for providing an internet service in a small area, such as hotspots in some fast food shops. The WiMAX system is widely applied to metropolitan area network (MAN) with a bandwidth about 2.3 GHz~2.4 GHz and 2.5 GHz~2.7 GHz and mainly used in a login circuit for connecting an internet service. That is, it replaces the present digital subscriber line (DSL) to provide a wireless broadband login service at the last mile. The WiFi system and the WiMAX system have a complementary relationship.

In the present notebook computer or hand-held device, the antenna structure applied to a WiFi system is normally a structure of multi-input and multi-output (MIMO), such as having two transmission terminals and three reception terminals (2×3) or three transmission terminals and three reception terminals (3×3). The antenna structure applied to the WiMAX system is normally a structure of single-input and multi-output (SIMO) or MIMO, such as having one transmission terminal and two reception terminals (1×2) or two transmission terminals and two reception terminals (2×2). Referring to FIG. 1, a schematic diagram of a conventional communication system is shown. A communication system 100, which is applied to a notebook computer or a hand-held device, includes a WiFi device 110, a WiMAX device 120, antennas 131~136, filters 141~146 and a microprocessor 150. The WiFi device 110 is a WiFi card and the WiMAX device 120 is a WiMAX card. Besides, for the purpose extension, the filter 145 is denoted by a dash line.

Due to control of the microprocessor 150 and isolation effects of the filters 141~143, the WiFi device 110 will receive the WiFi signal WF but not the WiMAX signal WM from the antennas 131~133. By the same reason, due to control of the microprocessor 150 and the isolation effects of the filters 144~146, the WiMAX device 120 will receive the WiMAX signal WM but not the WiFi signals WF from the antennas 134~136.

The notebook computer or hand-held device applies the above communication system 110 and antenna structure for the purpose of power saving and volume reduction. However, the above communication system 110 and antenna structure cannot effectively integrate the WiFi system and the WiMAX system and have to use two corresponding antenna structures, which may largely increase the cost without reducing the size and weight of the notebook computer or hand-held device. Besides, some notebook computers or hand-held devices may use a method of changing cards for the above two systems. However, the method of changing cards is to set the communication system in usage to be the WiFi system or the WiMAX system before the notebook computer or hand-held device leaves the factory. Therefore, although the volume of the notebook computer or hand-held device can be reduced, only one single system can be used at a time and this will reduce the convenience of using the WiFi system or WiMAX system simultaneously.

SUMMARY OF THE INVENTION

The invention is directed to a communication system, which includes the WiFi system and the WiMAX system and can operate simultaneously under the WiFi system and the WiMAX system.

According to a first aspect of the present invention, a communication system is provided. The communication system comprises a microprocessor, a WiFi device, a WiMAX device, common antennas, first filters, second filters, switching devices and power dividers. The common antennas are for receiving a WiFi signal and a WiMAX signal. The first filters are coupled to the WiFi device. The second filters are coupled to the WiMAX device. Each of the switching devices has an input terminal and an output terminal, wherein the output terminals of part of the switching devices are coupled to the first filters, and the output terminals of the other part of the switching devices are coupled to the second filters. Each of the power dividers has an input terminal coupled to the corresponding common antenna, a first output terminal coupled to the corresponding one of the part of the switching devices and a second output terminal coupled to the corresponding one of the other part of the switching devices. The microprocessor controls the switching devices such that the WiFi signal is coupled via the part of the switching devices and the first filters to the WiFi device and the WiMAX signal is coupled via the other part of the switching devices and the second filters to the WiMAX device.

According to a second aspect of the present invention, a communication system is provided. The communication system comprises a microprocessor, a WiFi device, a WiMAX device, common antennas and switching devices. The common antennas are for receiving a WiFi signal and a WiMAX signal. Each of the switching devices has an input terminal coupled to the corresponding common antenna, a first input terminal coupled to the WiFi device and a second output terminal coupled to the WiMAX device. When the communication system is applied to a WiFi system, the microprocessor controls the switching devices to isolate the WiMAX signal and couple the WiFi signal via the first output terminals to the WiFi device; when the communication system is applied to a WiMAX system, the microprocessor controls the switching devices to isolate the WiFi signal and couple the WiMAX signal via the second output terminals to the WiMAX device.

According to a third aspect of the present invention, a communication system is provided. The communication system comprises a microprocessor, a WiFi device, a WiMAX device, common antennas, first filters, second filters, and power dividers. The common antennas are for receiving a WiFi signal and a WiMAX signal. The first filters are coupled to the WiFi device. The second filters are coupled to the WiMAX device. Each of the power dividers has an input terminal coupled to the corresponding common antenna, a first output terminal coupled to the corresponding first filter and a second output terminal coupled to the corresponding second filter. The microprocessor controls the power dividers to isolate the WiFi signal and the WiMAX signal such that the WiFi signal is coupled via the first filters to the WiFi device and the WiMAX signal is coupled via the second filters to the WiMAX device.

The invention will become apparent from the following detailed description of the preferred but non-limiting embodiments. The following description is made with reference to the accompanying drawings.

DETAILED DESCRIPTION OF THE INVENTION

The invention is directed to a communication system, which includes the WiFi system and the WiMAX system and can operate simultaneously under the WiFi system and the WiMAX system.

Figure 1:
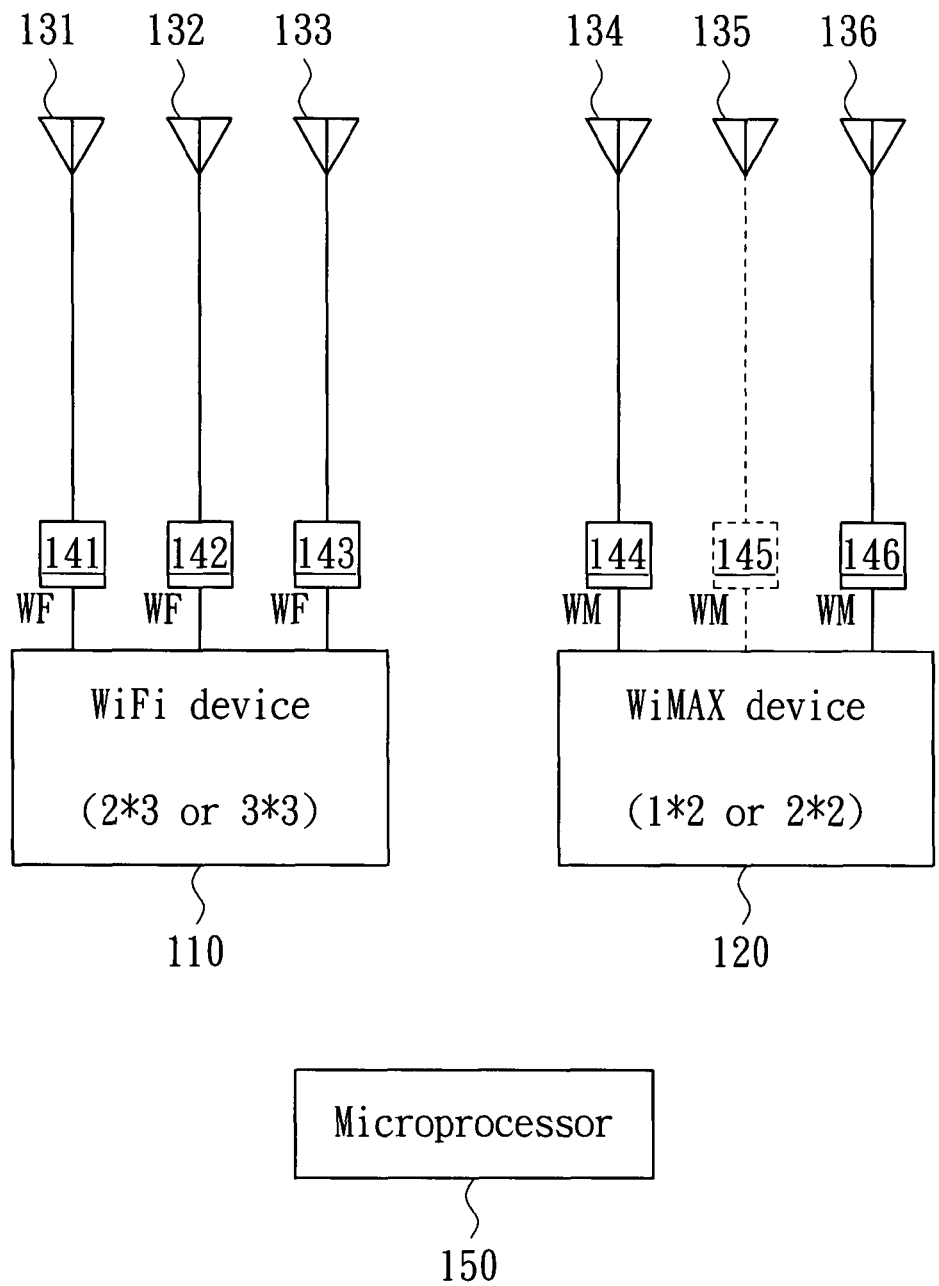
FIG. 1 is a schematic diagram of a conventional communication system.
Figure 2:
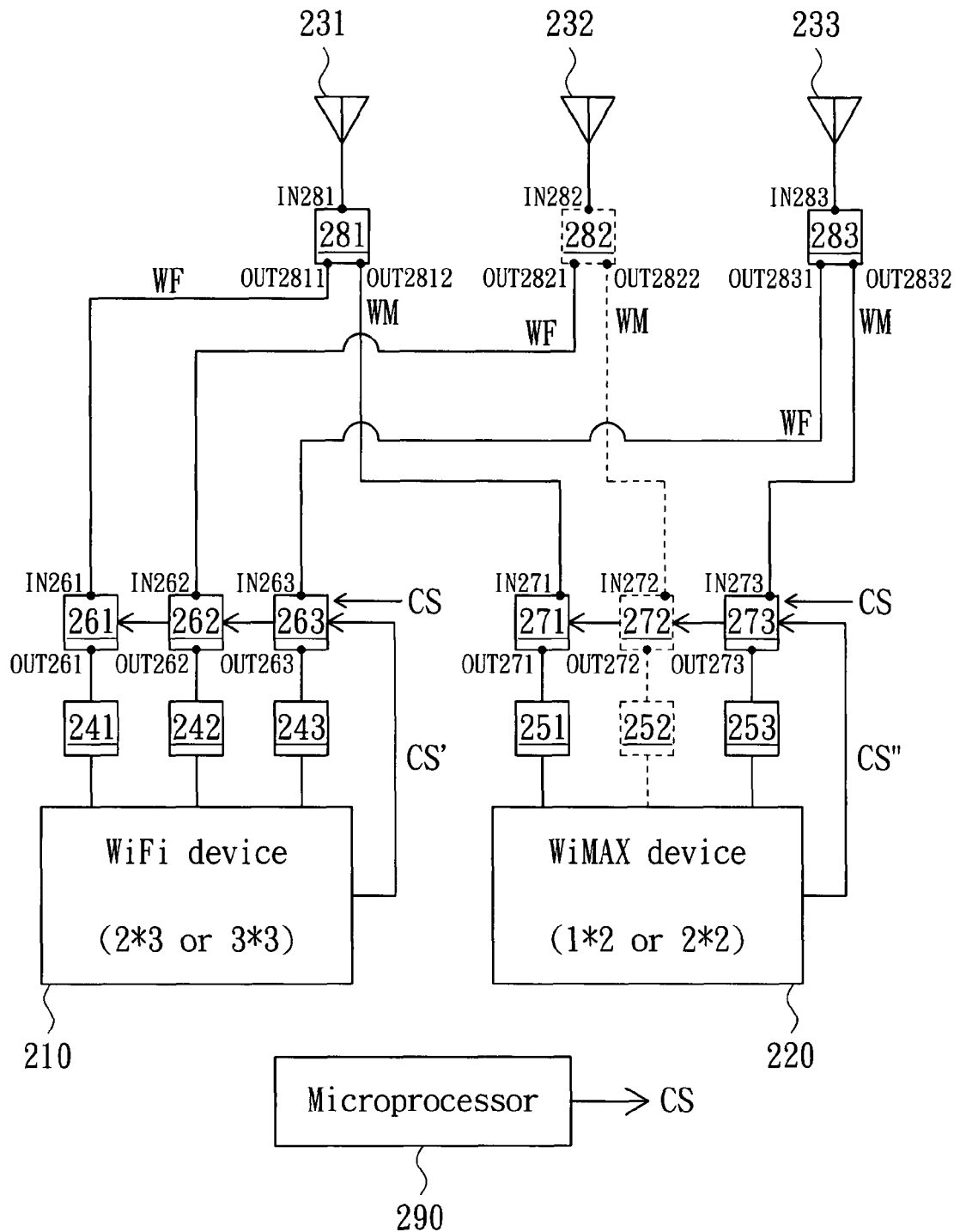
FIG. 2 is a schematic diagram of a communication system according to a first example of the invention.

Referring to FIG. 2, a schematic diagram of a communication system according to a first example of the invention is shown. A communication system 200, which is applied to a notebook computer, a car-packed device or a hand-held device, includes a microprocessor 290, a WiFi device 210, a WiMAX device 220, common antennas 231~233, first filters 241~243, second filters 251~253, switching devices 261~263 and 271~273 and power dividers 281~283. The WiFi device 210, WiMAX device 220, common antennas 231~233, first filters 241~243, second filters 251~253, switching devices 261~263, 271~273 and power dividers 281~283 form an antenna structure. The WiFi device 210 is a WiFi card and the WiMAX device 220 is a WiMAX card.

For the purpose of power saving and volume reduction, the WiFi device 210 uses an antenna with two transmission terminals and three reception terminals (2×3) or three transmission terminals and three reception terminals (3×3), while the WiMAX device 220 uses an antenna with one transmission terminal and two reception terminals (1×2) or two transmission terminals and two reception terminals (2×2). However, the invention is not limited thereto. Owing that the WiMAX device 220 may use an antenna with one transmission terminal and two reception terminals (1×2), the power divider 282, switching device 272 and second filter 252 are denoted by dash lines.

The common antenna 231~233 are used for receiving a WiFi signal WF or a WiMAX signal WM or both the signals WF and WM. The power dividers 281~283 respectively have input terminals IN281~IN283, first output terminals OUT2811~OUT2831 and second output terminals OUT2812~OUT2832. The input terminals IN281~IN283 of the power dividers 281~283 are correspondingly coupled to the common antennas 231~233. The first output terminals OUT2811~OUT2831 are correspondingly coupled to the switching devices 261~263 and the second output terminals OUT2812~OUT2832 are correspondingly coupled to the switching devices 271~273. The power dividers 281~283 have the function of high isolation by which the WiFi signal WF and the WiMAX signal WM will not couple together to generate an error in transmission.

The switching devices 261~263 and 271~273 are one pole one throw (1P1T) switches for determining whether the WiFi signal WF or WiMAX signal WM to pass. The switching devices 261~263 and 271~273 respectively have input terminals IN261~IN263 and IN271~IN273 and output terminals OUT261~OUT263 and OUT271~OUT273. The output terminals OUT261~OUT263 of part of switching devices 261~263 are coupled to the corresponding first filters 241~243 and the output terminals OUT271~273 of the other part of switching devices 271~273 are coupled to the corresponding second filters 251~253. The switching devices 261~263 and 271~273 have the same feature of high isolation. The switching devices 261~263 isolates the WiMAX signal WM from passing and the switching devices 271~273 isolates the WiFi signal WF from passing.

The first filters 241~143 are coupled to the WiFi device 210 and the second filters 251~253 are coupled to the WiMAX device 220. The first filters 241~243 are band pass filters for filtering the WiMAX signal WM not isolated by the switching devices 271~273. The first filters 241~243 and the second filters 251~253 have the feature of low insertion loss for the signals permitted to pass and have the feature of high attenuation for the signals not permitted to pass. The switching devices 261~263 and the corresponding first filters 241~243 can be exchanged in position. Similarly, the switching devices 271~273 and the corresponding first filters 251~253 can be exchanged in position.

The microprocessor 290 outputs control signals CS to respectively control the switching devices 261~263 and 271~273 such that the WiFi signal WF is coupled via the part of switching devices 261~263 and the first filters 241~243 to the WiFi device 210 and the WiMAX signal WM is coupled via the other part of the switching devices 271~273 and the second filters 251~253 to the WiMAX device 220. The switching devices 261~263 and 271~273 can also be respectively controlled by the WiFi device 210 and the WiMAX device 220.

For example, the media access controller (MAC) (not shown in the figure) inside the WiFi device 210 outputs a control signal CS' to control the switching devices 251~263 such that the WiFi signal WF is coupled via the switching devices 261~263 and the first filters 241~243 to the WiFi device 210. Besides, the MAC (not shown in the figure) inside the WiMAX device 220 outputs a control signal CS" to control the switching devices 271~273 such that the WiMAX signal WM is coupled via the switching devices 271~273 and the second filters 251~253 to the WiMAX device 220.

In the antenna structure and communication system disclosed by the embodiment, the WiFi device 210 and the WiMAX device 220 can operate concurrently or operate non-concurrently. That is, depended on environment and requirements, the user can simultaneously use the WiFi system and the WiMAX system or just use one of them.

Figure 3:
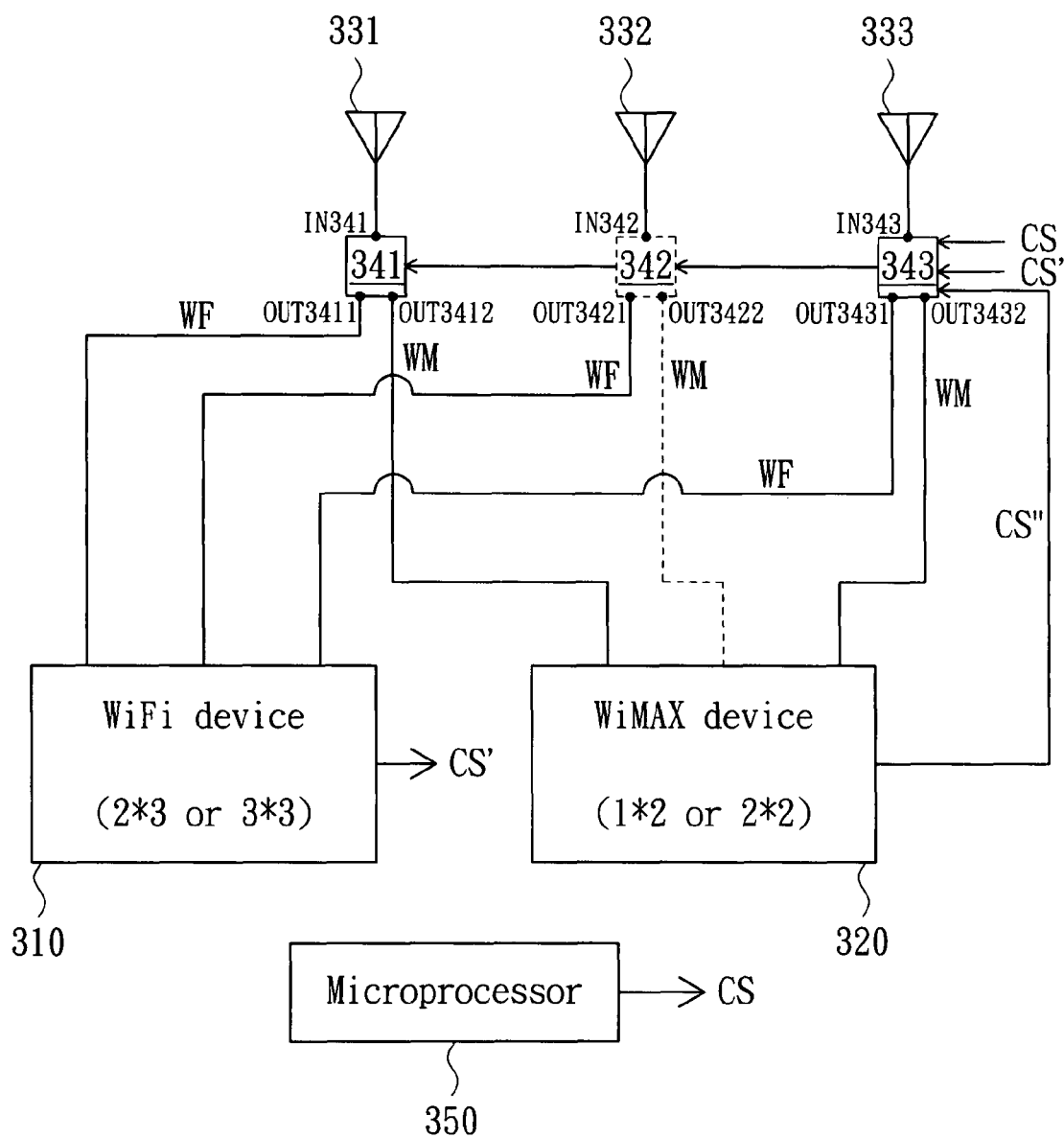
FIG. 3 is a schematic diagram of a communication system according to a second example of the invention.

Referring to FIG. 3, a schematic diagram of a communication system according to a second example of the invention is shown. A communication system 300, which is applied to a notebook computer, a car-packed device or a hand-held device, includes a microprocessor 350, a WiFi device 310, a WiMAX device 320, common antennas 331~333 and switching devices 341~343. The WiFi device 310, WiMAX device 320, common antennas 331~333 and switching devices 341~343 form an antenna structure. The WiFi device 310 is a WiFi card and the WiMAX device 320 is a WiMAX card. Moreover, by the same reason as the first example, the switching device 342 is denoted by a dash line.

The common antennas 331~333 are used for receiving a WiFi signal WF and a WiMAX signal WM. The switching devices 341~343 are one pole double throw (1P2T) switches for determining whether the WiFi signal WF or the WiMAX signal WM to pass. The switching devices 341~343 respectively have input terminals IN341~IN343, first output terminals OUT3411~OUT3431 and second output terminals OUT3412~OUT3432. The input terminals IN341~IN343 of the switching devices 341~343 are correspondingly coupled to the common antennas 331~333. The first output terminals OUT3411~OUT3431 are coupled to the WiFi device 310 and the second output terminals OUT3412~OUT3432 are coupled to the WiMAX device 320. The switching devices 341~343 have the function of high isolation by which the WiFi signal WF and the WiMAX signal WM will not couple together to generate an error in transmission.

When the communication system 300 is applied to a WiFi system, the microprocessor 350 outputs a control signal CS to control the switching devices 341~343 to isolate the WiMAX signal WM and couple the WiFi signal WF via the first output terminals OUT3411~OUT3431 to the WiFi device 310. When the communication system 300 is applied to a WiMAX system, the microprocessor 350 outputs the control signal CS to control the switching devices 341~343 to isolate the WiFi signal WF and couple the WiMAX signal WM via the second output terminals OUT3412~OUT3432 to the WiMAX device 320. Besides, the switching devices 341~343 can also be respectively controlled by the WiFi device 310 and the WiMAX device 320.

For example, when the communication system 300 is applied to a WiFi system, the MAC (not shown in the figure) inside the WiFi device 310 outputs a control signal CS' to control the switching devices 341~343 to isolate the WiMAX signal WM and couple the WiFi signal WF via the first output terminals OUT3411~OUT3431 to the WiFi device 310. When the communication system 300 is applied to a WiMAX system, the MAC (not shown in the figure) inside the WiMAX device 320 outputs a control signal CS" to control the switching devices 341~343 to isolate the WiFi signal WF and couple the WiMAX signal WM via the second output terminals OUT3412~OUT3432 to the WiMAX device 320.

In the antenna structure and communication system disclosed by the embodiment, the WiFi device 310 and the WiMAX device 320 operate non-concurrently. That is, depended on environment and requirements, the user selects one of them for use. However, the antenna structure and communication system have integrated the WiFi system and the WiMAX system, which largely reduces the volume of the whole system.

Figure 4:
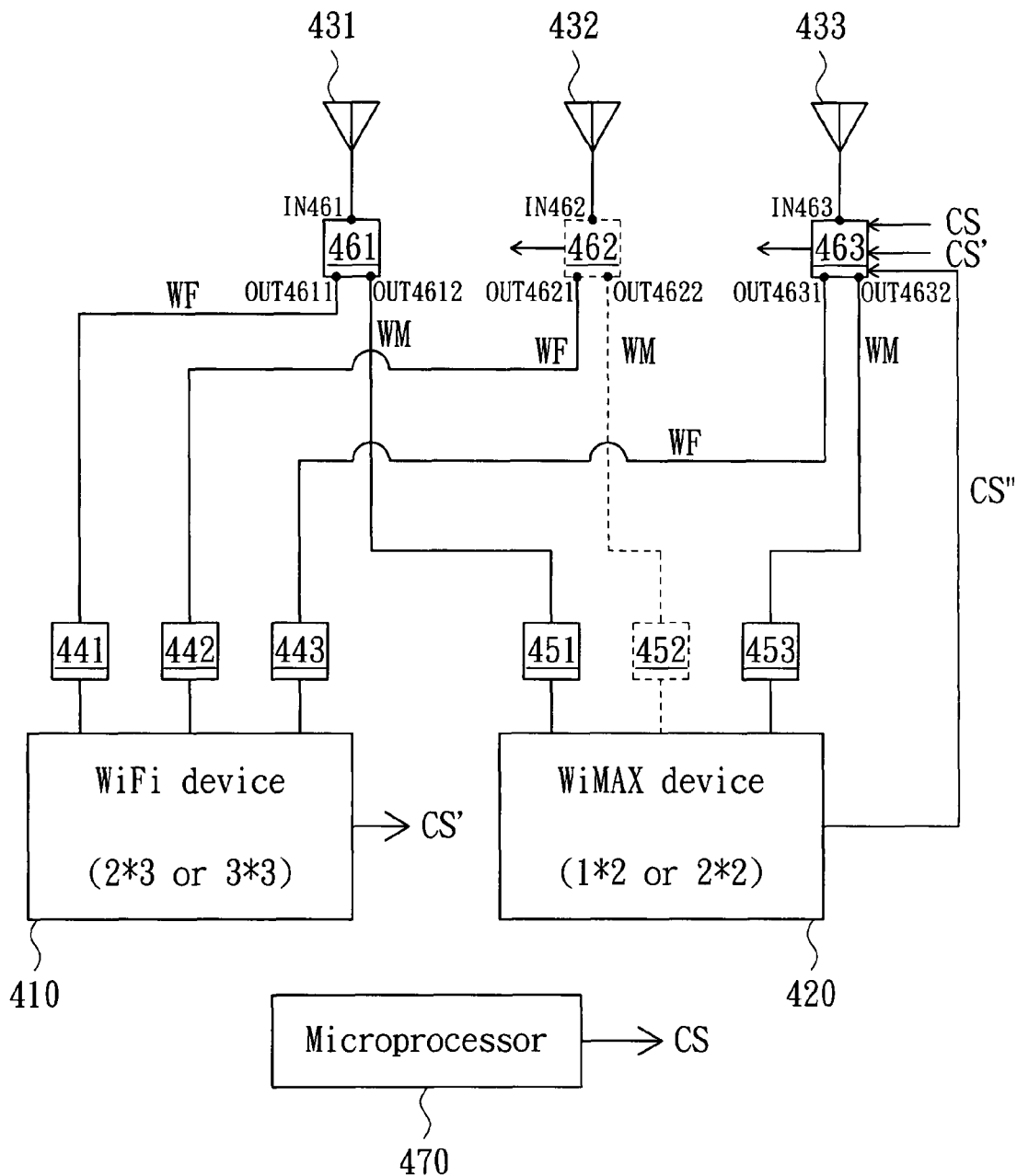
FIG. 4 is a schematic diagram of a communication system according to a third example of the invention.

Referring to FIG. 4, a schematic diagram of a communication system according to a third example of the invention is shown. A communication system 400, which is applied to a notebook computer, a car-packed device or a hand-held device, includes a microprocessor 470, a WiFi device 410, a WiMAX device 420, common antennas 431~433, first filters 441~443, second filters 451~453, and power dividers 461~463. The WiFi device 410, WiMAX device 420, common antennas 431~433, first filters 441~443, second filters 451~453, and power dividers 461~463 form an antenna structure. The WiFi device 410 is a WiFi card and the WiMAX device 420 is a WiMAX card. Moreover, by the same reason as the first example, the power divider 462 is denoted by a dash line.

The common antennas 431~433 are for receiving a WiFi signal WF and a WiMAX signal WM. The power dividers 461~463 respectively have input terminals IN461~IN463, first output terminals OUT4611~OUT4631 and second output terminals OUT4612~OUT4632. The input terminals IN461~IN463 of the power dividers 461~463 are correspondingly coupled to the common antennas 431~433. The first output terminals OUT4611~OUT4631 are correspondingly coupled to first filters 441~443 and the second output terminals OUT4612~OUT4632 are correspondingly coupled to the second filters 451~453. The power dividers 461~463 have the function of high isolation by which the WiFi signal WF and the WiMAX signal WM will not couple together to generate an error in transmission.

The first filters 441~443 are coupled to the WiFi device 410 and the second filters 451~453 are coupled to the WiMAX device 420. The first filters 441~443 are band pass filters for filtering the WiMAX signal WM not isolated by the power dividers 461~463. The second filters 451~453 are band stop filters or low pass filters for filtering the WiFi signal WF not isolated by the power dividers 461~463. The first filters 441~443 and the second filters 451~453 have the feature of low insertion loss for the signals permitted to pass and have the feature of high attenuation for the signals not permitted to pass.

The microprocessor 470 outputs control signals CS to respectively control the power dividers 461~463 to isolate the WiFi signal WF and the WiMAX signal WM such that the WiFi signal WF is coupled via the first filters 441~443 to the WiFi device 410 and the WiMAX signal WM is coupled via the second filters 451~453 to the WiMAX device 420. Besides, the power dividers 461~463 can also be respectively controlled by the WiFi device 410 and the WiMAX device 420.

For example, the MAC (not shown in the figure) inside the WiFi device 410 outputs a control signal CS' to control the power dividers 461~463 to isolate the WiFi signal WF and the WiMAX signal WM such that the WiFi signal WF is coupled via the first filters 441~443 to the WiFi device 410 and the WiMAX signal WM is coupled via the second filters 451~453 to the WiMAX device 420. Or the MAC (not shown in the figure) inside the WiMAX device 420 outputs a control signal CS" to control the power dividers 461~463 to isolate the WiFi signal WF and the WiMAX signal WM such that the WiFi signal WF is coupled via the first filters 441~443 to the WiFi device 410 and the WiMAX signal WM is coupled via the second filters 451~453 to the WiMAX device 420.

In the communication system disclosed by the embodiment, the WiFi device 410 and the WiMAX device 420 can operate concurrently or operate non-concurrently. That is, depended on environment and requirements, the user can simultaneously use the WiFi system and the WiMAX system or just use one of them.

The communication system disclosed by the above embodiment of the invention include both the WiFi system and the WiMAX system and can operate simultaneously under the WiFi system and the WiMAX system, which provides the user with convenience. Furthermore, owing that the WiFi system and the WiMAX system have been integrated with the common antennas, the whole system will have smaller volume and weight. Due to system simplification, the layout wiring is simplified to reduce system cost.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A communication system, comprising:
   a microprocessor;
   a WiFi device;
   a WiMAX device;

a plurality of common antennas, for receiving a WiFi signal and a WiMAX signal;
a plurality of first filters, coupled to the WiFi device;
a plurality of second filters, coupled to the WiMAX device;
a plurality of switching devices, each having an input terminal and an output terminal, wherein the output terminals of part of the switching devices are coupled to the first filters, and the output terminals of the other part of the switching devices are coupled to the second filters; and
a plurality of power dividers, each having an input terminal coupled to the corresponding common antenna, a first output terminal coupled to the corresponding one of the part of the switching devices and a second output terminal coupled to the corresponding one of the other part of the switching devices;
wherein the microprocessor controls the switching devices such that the WiFi signal is coupled via the part of the switching devices and the first filters to the WiFi device and the WiMAX signal is coupled via the other part of the switching devices and the second filters to the WiMAX device.

2. The communication system according to claim 1, wherein the switching devices are single pole single throw (1P1T) switches for determining whether the WiFi signal or the WiMAX signal to pass.

3. The communication system according to claim 1, wherein the first filters are band pass filters for filtering the WiMAX signal not isolated and being coupled via the part of the switching devices to the first filters.

4. The communication system according to claim 1, wherein the second filters are band stop filters or low pass filters for filtering the WiFi signal not isolated and being coupled via the other part of the switching devices to the second filters.

5. The communication system according to claim 1, wherein the part of the switching devices and the corresponding first filters can be exchanged in position and the other part of the switching devices and the corresponding second filters can be exchanged in position.

6. The communication system according to claim 1, wherein the WiFi device is a WiFi card and the WiMAX device is a WiMAX card.

7. The communication system according to claim 1, is applied to a notebook computer, a car-packed device or a hand-held device.

8. The communication system according to claim 1, wherein the WiFi device and the WiMAX device operate concurrently.

9. The communication system according to claim 1, wherein the WiFi device and the WiMAX device operate non-concurrently.

10. The communication system according to claim 1, wherein the WiFi device controls the part of the switching devices such that the WiFi signal is coupled via the part of the switching devices and the first filters to the WiFi device.

11. The communication system according to claim 1, wherein the WiMAX device controls the other part of the switching devices such that the WiMAX signal is coupled via the other part of the switching devices and the second filters to the WiMAX device.

12. A communication system, comprising:
a microprocessor;
a WiFi device;
a WiMAX device;
a plurality of common antennas, for receiving a WiFi signal and a WiMAX signal; and
a plurality of switching devices, each having an input terminal coupled to the corresponding common antenna, a first output terminal coupled to the WiFi device and a second output terminal coupled to the WiMAX device;
wherein when the communication system is applied to a WiFi system, the microprocessor controls the switching devices to isolate the WiMAX signal and couple the WiFi signal via the first output terminals to the WiFi device;
wherein when the communication system is applied to a WiMAX system, the microprocessor controls the switching devices to isolate the WiFi signal and couple the WiMAX signal via the second output terminals to the WiMAX device.

13. The communication system according to claim 12, wherein the WiFi device is a WiFi card and the WiMAX device is a WiMAX card.

14. The communication system according to claim 12, wherein the switching devices are single pole double throw (1P2T) switches.

15. The communication system according to claim 12, is applied to a notebook computer, a car-packed device or a hand-held device.

16. The communication system according to claim 12, wherein the WiFi device and the WiMAX device operate non-concurrently.

17. The communication system according to claim 12, wherein when the communication system is applied to the WiFi system, the WiFi device controls the switching devices to isolate the WiMAX signal and couple the WiFi signal via the first output terminals to the WiFi device.

18. The communication system according to claim 12, wherein when the communication system is applied to the WiMAX system, the WiMAX device controls the switching devices to isolate the WiFi signal and couple the WiMAX signal via the second output terminals to the WiMAX device.

* * * * *